BEST AVAILABLE COPY

Thompson & Mitchell,

Permutation Lock.

No. 8,786. Reissued Oct. 22, 1867.

Witnesses.
William Cragg
John J. Kiefe Jr

Inventors
George Thompson
Henry Mitchell
per Francis D. Pastorius
Attorney.

BEST AVAILABLE COPY

UNITED STATES PATENT OFFICE.

GEORGE THOMPSON AND HENRY MITCHELL, OF TRENTON, NEW JERSEY, ASSIGNEES OF A. W. JOHNSON AND GEORGE THOMPSON.

IMPROVEMENT IN PERMUTATION-LOCKS.

Specification forming part of Letters Patent No. 64,880, dated May 21, 1867; Reissue, No. 2,796, dated October 22, 1867.

*To all whom it may concern:*

Be it known that GEORGE THOMPSON and A. W. JOHNSON, both of the city, county, and State of New York, have invented a new and useful Improvement in Locks; and we, GEORGE THOMPSON and HENRY MITCHELL, both of Trenton, in the county of Mercer and State of New Jersey, assignees of GEORGE THOMPSON and A. W. JOHNSON, do hereby declare that the following description, taken in connection with the accompanying drawings, hereinafter referred to, forms a full and exact specification of the same, wherein we have set forth the nature and principles of the said improvements by which the said invention may be distinguished from all others of a similar class, together with such parts as are claimed.

The present invention relates to that class of locks known as "combination-locks;" and the invention consists in a novel construction o the same, whereby simplicity of arrangement, effectiveness of operation, and security against being opened or unlocked when locked by persons without authority are obtained, as will be obvious from the following detailed description of the same, reference being had to the accompanying plate of drawings, in which—

Figure 4:
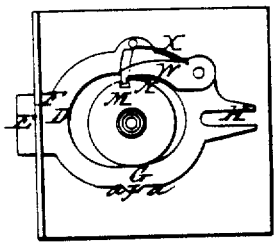
Figure 3:
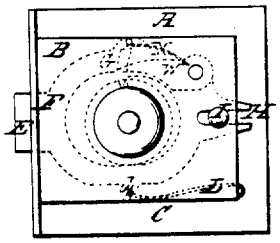
Figure 2:
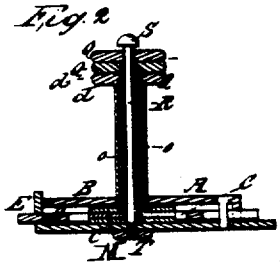
Figure 1:
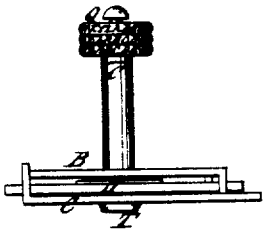

Figure 1 is a view of one edge of the lock-casing; Fig. 2, a central section through the thickness of the casing of the lock; Fig. 3, a view of the front plate of the lock-casing, showing the bolt and other parts dotted in; Fig. 4, a view of the interior of the lock with the front plate of the lock-casing removed, and Fig. 5 a view showing the notch N′.

Similar letters refer to similar parts in the several views.

Figure 5:
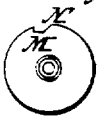

A in the drawings represents the lock-casing, which in the present instance is made of a square shape of suitable size to receive its various working parts; B, the front, and C the back plate, of the lock-casing; D, the bolt, which, by its straight portion E, plays through the top or end piece, F, of the lock-casing, from which, extending by its circular-shaped yoke portion G into the lock-casing, it plays by its inner forked end, H, upon a fixed stud or pin, I, of the lock-casing; J, a projection on one side or edge of the bolt-yoke G, over which, as the bolt is moved in or out, as will be hereinafter described, plays the loose end, K, of a bent spring, L, secured at its other end to the lock-casing, this spring acting to hold the bolt either in or out, as the case may be, by bearing on either one or the other of the shoulders *a* of the projection J, as the case may be; M, a series of flat circular-shaped disk-tumblers of uniform diameter and thickness, which disks are placed one against another in and between the sides of the yoke-frame G of the lock-bolt, as plainly shown in Fig. 4 of the drawings. Each disk-tumbler M is similarly notched at one point of its periphery, one of which notches, N, is shown in Fig. 4; and for a purpose to be hereinafter described, the notch N′ in one of said disk has one of its sides extended or forming an angle to the base different from the other side, as shown in Fig. 5, and by dotted lines at *b*, in Fig. 4.

To each disk-tumbler, M, a tube, O, is connected, each of suitable internal and external diameter to fit one over and about the other, as illustrated in section in Fig. 2 of the drawings, forming a series of concentric tubes, which pass through the front plate. The outer ends of the tubes O are similarly provided with teeth *c*, the tubes being of unequal lengths, with the inner one of the series the longest and the outer one the shortest, and with the said teeth *c* of each tube the toothed edge or flange *d* of a series of rings, Q, engages, the one with the outer tube and the two others with the inner and intermediate tubes.

We do not wish to confine ourselves to tubes O, of unequal length, as shown, since by varying the length of the toothed flanges or hubs *d* of the rings Q tubes of equal lengths can be employed. These rings Q fit one against the other, their hubs or flanges *d* taking one into the other, that of the outer end being innermost, as shown in Fig. 2 of the drawings, where, by means of a rod or bolt, R, passing loosely through the center tube with a head, S, at one end and a screw-nut, T, at the other, they are held, while at the same time they can be freely turned, and through the engagement of their teeth with those of the tubes the

BEST AVAILABLE COPY disk-tumbler correspondingly turned. When it is required to change the index or letters, the coming together of which either forward or retreat the lock-bolt, the screw-nut T is loosened, and the bolt R set out, thereby permitting the rings Q to disengage from each other, and from their respective tubes, if the bolt R were riveted to the back plate of the lock, it will be easily seen that the rings Q could not be disengaged, and that the locking and unlocking index or figures made impossible of permutation.

The periphery of each of the series of rings is marked off into a series of divisions, with the division-lines of the several rings occupying such relative positions that no two of any two of the series can coincide at any one time.

W is a catch-lever hung upon one side of the bolt-yoke G, which lever by its spring X is forced to bear against the edge of the disk tumblers, so that when the notches of such disks all coincide it will engage therewith, and thus, if the tumblers are then turned, cause the bolt to be thrown in or out, as the case may be.

With a lock of the above-described construction and arrangement of parts it is plain to be understood that, to lock and unlock it the notches of the disk-tumblers are required to coincide, so as to allow the proper connection to be established between them and the bolt to produce the desired inward or outward throw of the bolt, as the case may be. The bringing together of these notches is accomplished through the graduated rings by turning them in the proper direction therefor, or, in other words, setting them so that certain ones of their divisions will coincide, for facilitating which the several divisions or graduations are lettered as shown in the drawings, Fig. 1.

To break the interlocking of the catch-lever with the tumbler-disk, such lever is lifted out of the same by turning in the proper direction that tumbler-disk which has its notch extended, when, then turning the other tumblers, the adjustment is obviously broken, whereby the lock cannot then be changed—that is, locked if unlocked, or unlocked if locked—without the proper adjustment of the notches has first been made.

In conclusion, it may be here observed that the catch-lever, as it enters the notches, owing to the spring which forces it, necessarily produces a clicking sound, by which, were nothing adopted to disguise it, the necessary adjustment of the disk-notches might by chance be made; and therefore to obviate all possibility of the lock thus being unlocked we deem it best and advisable to notch at different points the edges or peripheries of the disk-tumblers sufficiently, that, while such notches will not allow the catch-lever to thus become engaged with the tumblers, it will occasion a similar clicking sound to that produced by the lever-catch as it drops into the notches, thereby, as is evident, serving as a "blind" to any person attempting to unlock it.

What we claim as the invention of GEORGE THOMPSON and A. W. JOHNSON, and desire to secure by Letters Patent, is—

1. The notched disks or tumblers M, each having a tube, *o*, fixed to it, the outer end of which is provided with teeth to engage with similar teeth on the hubs or flanges *d* of the graduated rings Q, substantially as and for the purpose herein shown and described.

2. Attaching the rod or bolt R to the back plate of the lock by means of a nut, T, to facilitate the permutation of the index or opening letters, and also to more effectually preserve the connection of the rings Q with their respective tubes *o*.

In testimony whereof we hereunto sign our names to this specification in presence of two subscribing witnesses.

GEORGE THOMPSON.
HENRY MITCHELL.

Witnesses:
ISRAEL HOWELL,
WM. C. HOWELL.